US008546720B2

(12) United States Patent
Lin et al.

(10) Patent No.: US 8,546,720 B2
(45) Date of Patent: Oct. 1, 2013

(54) HYBRID WELDING APPARATUS AND SYSTEM AND METHOD OF WELDING

(75) Inventors: Dechao Lin, Greer, SC (US); Yan Cui, Greer, SC (US); Brian L Tollison, Honea Path, SC (US); David Schick, Greenville, SC (US); Bill D Johnston, Jr., Easley, SC (US); Srikanth Chandrudu Kottilingam, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 245 days.

(21) Appl. No.: 13/086,114

(22) Filed: Apr. 13, 2011

(65) Prior Publication Data

US 2012/0261389 A1   Oct. 18, 2012

(51) Int. Cl.
   *B23K 10/00*   (2006.01)
(52) U.S. Cl.
   USPC ............ 219/121.46; 219/121.64; 219/121.59; 219/121.76; 228/112.1
(58) Field of Classification Search
   CPC ........ B23K 10/00; B23K 26/00; B23K 20/12; B23K 26/04
   USPC ............ 219/121.45, 121.46, 121.48, 121.59, 219/121.63, 121.64, 121.76, 121.72; 228/112.1
   See application file for complete search history.

(56) References Cited

U.S. PATENT DOCUMENTS

| 4,689,466 | A | | 8/1987 | Hoshinouchi et al. |
| 5,006,688 | A | | 4/1991 | Cross |
| 5,603,853 | A | * | 2/1997 | Mombo-Caristan ..... 219/121.64 |
| 5,700,989 | A | | 12/1997 | Dykhno et al. |
| 6,906,281 | B2 | * | 6/2005 | Musselman .............. 219/121.64 |
| 7,154,065 | B2 | * | 12/2006 | Martukanitz et al. .... 219/121.64 |
| 7,874,471 | B2 | * | 1/2011 | Fairchild et al. .......... 228/112.1 |
| 8,253,061 | B2 | * | 8/2012 | Nowak et al. ............ 219/121.63 |
| 8,350,185 | B2 | * | 1/2013 | Lee et al. ................. 219/121.64 |
| 2005/0011868 | A1 | | 1/2005 | Matile et al. |

(Continued)

FOREIGN PATENT DOCUMENTS

DE   19916831 A1   10/2000

OTHER PUBLICATIONS

Steven G. Shi, Paul Hilton, Steve Mulligan and Geert Verhaeghe, "Hybrid Nd: YAG laser-mag welding of thick section steel with adaptive control", TWI (http://www.twi.co.uk/content/spsgsoct2004.html), p. 1-23, Oct. 2004, Cambridge UK.

(Continued)

*Primary Examiner* — Mark Paschall
(74) *Attorney, Agent, or Firm* — McNees Wallace & Nurick, LLC

(57) ABSTRACT

A hybrid welding apparatus, and a system and method for welding at least two adjacent components having a large gap of approximately 3.0 millimeters that results in a full-penetration weld is provided. The welding system includes a hybrid welder having a defocused laser beam, an electric arc welder, and at least one bridge piece adjacent to one or more of the at least two adjacent components. The defocused laser beam and the electric arc welder are arranged and disposed to direct energy onto the at least two adjacent components to create a common molten pool operable to provide a full penetration weld to bridge the gap at a high constant weld speed, thereby joining the two adjacent components with a weld.

17 Claims, 4 Drawing Sheets

(56) References Cited

U.S. PATENT DOCUMENTS

| | | |
|---|---|---|
| 2007/0017906 A1 | 1/2007 | Nowak et al. |
| 2008/0257870 A1 | 10/2008 | Longfield |
| 2010/0021317 A1 | 1/2010 | Hanaoka |
| 2010/0078412 A1 | 4/2010 | Diez et al. |
| 2011/0042361 A1 | 2/2011 | Nowak |
| 2011/0198317 A1 | 8/2011 | Lin |

OTHER PUBLICATIONS

"Lecture 3.3: Principles of Welding", ESDEP Lecture Note [WG3] (http://www.haiyangshiyou.com/esdep/master/wg03/t0300.htm), Nov. 22, 2010.

Moriaki Ono, Yukio Shinbo, Akihide Yoshitake and Masanori Ohmura, "Development of Laser-arc Hybrid Welding", NKK Technical Review (http://www.lac-online.nl/dfl/f/development_of_hybrid_welding.pdf), No. 86, p. 8-12 (2002).

"Lecture 3.4: Welding Processes", ESDEP Lecture Note [WG3] (http://www.haiyangshiyou.com/esdep/master/wg03/toc.htm), Nov. 22, 2010.

"Laser Welding Review", Engineers Edge Solutions by Design (http://www.engineersedge.com/manufacturing/laser_welding.htm), Jan. 2011.

J. W. Elmer, "Characterization of Defocused Electron Beams and Welds in Stainless Steel and Refractory Metals using the Enhanced Modified Faraday Cup Diagnostic", Lawrence Livermore National Laboratory, p. 1-9, Jan. 23, 2009.

"Fiber laser", Wikipedia (http://en.wikipedia.org/wiki/Fiber_laser), Mar. 29, 2006.

"Disk laser", Wikipedia (http://en.wikipedia.org/wiki/Disk_laser), Jan. 25, 2007.

Nd: YAG laser, Wikipedia (http://en.wikipedia.org/wiki/Nd:YAG_laser), Feb. 26, 2004.

Carbon dioxide laser, Wlkipedia (http://en.wikipedia.org/wiki/Carbon_dioxide_laser), Nov. 17, 2008.

Search Report and Written Opinion from corresponding EP Application No. 12163444.8-2302 dated Jul. 25, 2012.

\* cited by examiner

HYBRID WELDING APPARATUS AND SYSTEM AND METHOD OF WELDING

FIELD OF THE INVENTION

This invention relates to gas turbine technology generally, and specifically, to a hybrid welding apparatus and a hybrid welding system and a method for joining components with large gaps including gaps up to approximately three millimeters in size.

BACKGROUND OF THE INVENTION

Gaps present in joints are an issue that affects manual and automated welding processes. With manual welding, a welder can change the weld parameters intuitively, resulting in a good weld. Automated welding does not have the flexibility of manual welding. To achieve good welds in automated welding adaptive control, that is oftentimes difficult and cumbersome to implement, is used. The methods currently employed in automated welding include cumbersome programs and cameras to allow adaptive control to try and address the joint gap issue.

Larger gaps of more than 1.5 millimeters are difficult to bridge using automated high-power density laser (or electron) beam welding. Using adaptive control to slow down the welding speeds and increase the filler metal delivery rates does not provide adequate gap bridging. Trying to use conventional welding techniques to fill larger gaps results in unstable weld pools, which can result in blow through holes, lack of penetration, or lack of fusion between the components that are joined.

A limited solution used to bridge a gap is to use a shim to physically fill the gap prior to welding and use a focused laser beam or electron beam to melt the shim. Generally, this focused laser beam/electron beam (EB) with shim method only bridges small gaps of less than 1 millimeter.

Generally, for a joint having variable gaps it is hard to guarantee the weld quality of the resulting weld using traditional welding processes. Although it is recognized that electric arc welders with consumable electrodes, for example a gas metal arc welder (GMAW), can make required material deposition, the GMAW cannot go deep into the material because of its lower power density. So although a GMAW can bridge a larger gap, the problem is a lack of weld penetration and a likelihood of lack of fusion happening in the joint.

Therefore, a hybrid welding apparatus, a hybrid welding system and a method of welding that do not suffer from the above drawbacks are desirable in the art.

SUMMARY OF THE INVENTION

According to an exemplary embodiment of the present disclosure, a hybrid welding system is provided. The hybrid welding system includes a hybrid welder having a defocused laser and an electric arc welder. The hybrid welding system also includes at least two adjacent components to be welded, the at least two adjacent components having a gap therebetween. The hybrid welding system further includes at least one bridge piece, wherein the at least one bridge piece is adjacent to one or more of the at least two adjacent components. The defocused laser and the electric arc welder of the hybrid welding system are arranged and disposed to direct energy toward the at least two adjacent components to create a common molten pool. The common molten pool is operable to provide a full penetration weld to bridge the gap at a high constant weld speed.

According to another exemplary embodiment of the present disclosure, a method for welding at least two adjacent components is provided. The method includes providing a hybrid welder having a defocused laser and an electric arc welder. The method includes providing two adjacent components having a gap therebetween. The method includes placing a bridge piece adjacent to one or both of the adjacent components. The method further includes directing energy toward one or both of the adjacent components with the hybrid welder, wherein the defocused laser and the electric arc welder create a common molten pool. The common molten pool is operable to provide a full penetration weld that bridges the gap at a high constant weld speed.

According to another exemplary embodiment of the present disclosure, a hybrid welding apparatus including a defocused laser and an electric arc welder is provided. The defocused laser and the electric arc welder are arranged and disposed to direct energy toward at least two adjacent components having a gap therebetween. The directed energy creates a common molten pool operable to provide a full penetration weld to bridge a gap at a high constant weld speed.

Other features and advantages of the present disclosure will be apparent from the following more detailed description of the preferred embodiments, taken in conjunction with the accompanying drawings which illustrate, by way of example, the principles of the disclosure.

BRIEF DESCRIPTION OF THE DRAWINGS

Wherever possible, the same reference numbers will be used throughout the drawings to represent the same parts.

DETAILED DESCRIPTION OF THE INVENTION

Provided is a hybrid welding apparatus, a hybrid welding system and a method of welding that do not suffer from the drawbacks in the prior art and provides a full penetration weld to bridge a gap of up to approximately 3.0 millimeters at a high constant weld speed.

Figure 1:
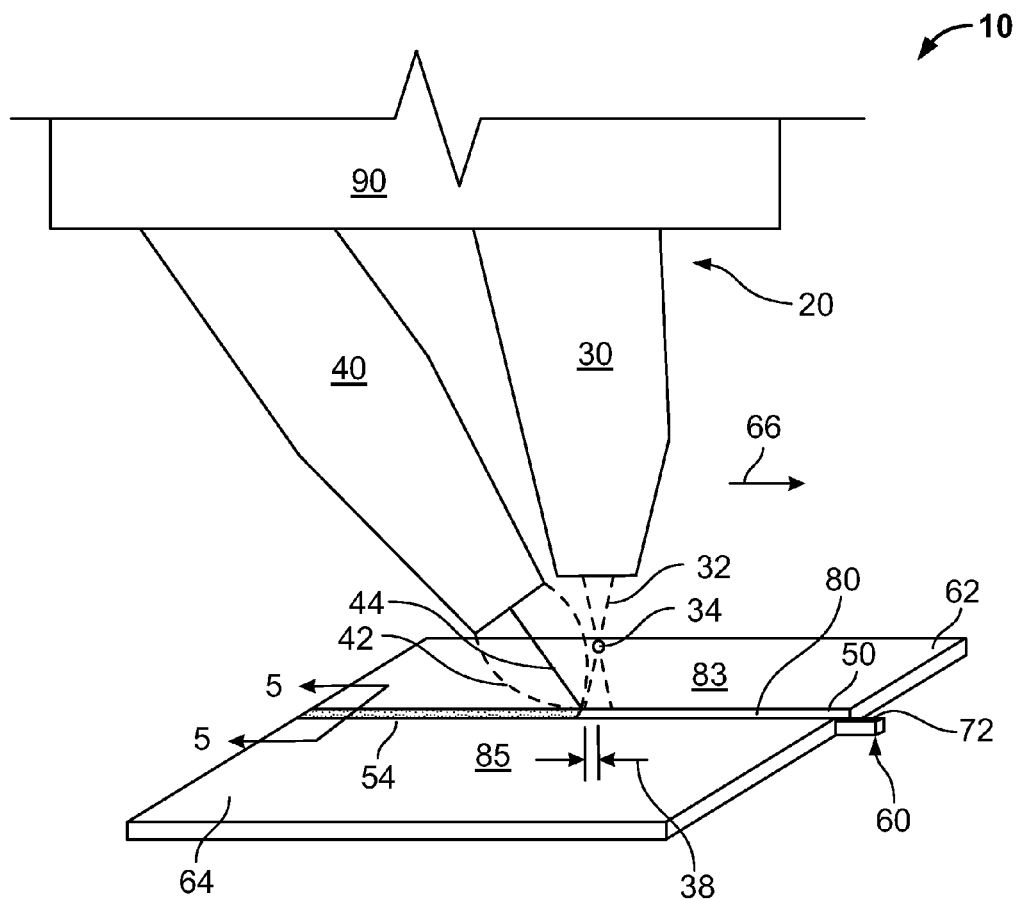
FIG. 1 is a perspective view of a schematic representation of the hybrid welding system of the present disclosure.

FIG. 1 schematically illustrates a hybrid welding system 10 including a hybrid welder 20 of the present disclosure. The hybrid welder 20 includes a defocused laser 30 and an electric arc welder 40. In one embodiment, the defocused laser 30 and electric arc welder 40 are arranged and disposed to direct energy toward at least two adjacent workpieces or components 62 and 64. The two adjacent components 62 and 64 have a gap 50, therebetween. The gap 50 results from problems with parts assembly, tooling, fixturing, and or other reasons. In another embodiment, the components 62 and 64 are aligned to create a gap 50. In one embodiment, a bridge piece 60 is placed in the gap 50 between the components 62 and 64 to create a joint 80 between components 62 and 64 (see FIG.

4). The bridge piece 60 is, for example, but not limited to, any wire 70 (see FIG. 4), shim 72 (see FIG. 3) or other filler material that sufficiently fits into the gap 50 and is generally adjacent to or touching the components 62 and 64 to be welded. In another embodiment, the bridge piece 60 is, for example, but not limited to, a stacked wire, a stacked shim, or combination thereof. In one embodiment, the height of the shim 72 is less than the height of the components 62 and 64. In another embodiment, the shim height is equal to or greater than that of the components 62 and 64.

Figure 4:
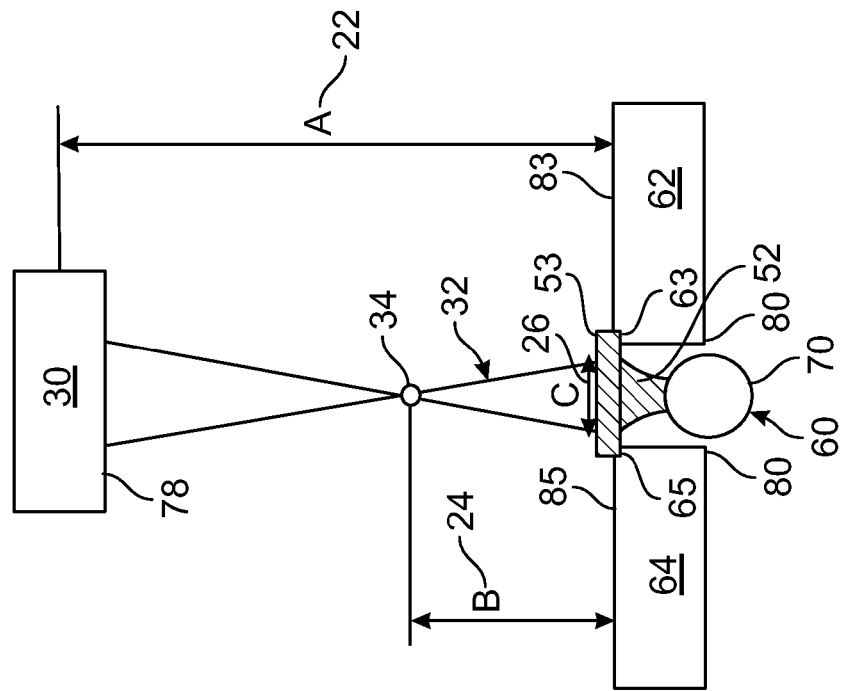
FIG. 4 is a schematic view of the defocused laser and common molten pool of the hybrid welding system of the present disclosure.
Figure 3:
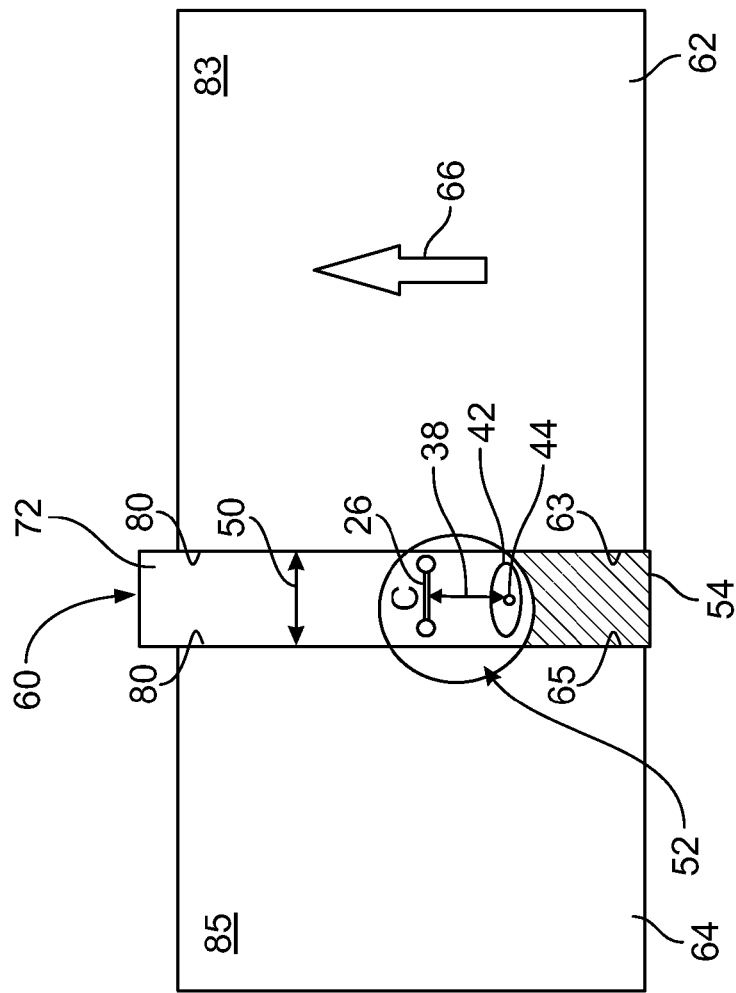
FIG. 3 is a top view of the hybrid welding system of the present disclosure with the hybrid welding equipment removed.

Referring to FIGS. 3 and 4, the combined energy from the defocused laser 30 and electric arc welder 40 are directed toward the components 62 and 64 and the gap 50 to create a common molten pool 52. The common molten pool 52 operates to provide a full penetration weld 54 to bridge the gap 50 between components 62 and 64 at a high constant weld speed. As used "common molten pool" 52 refers to the molten material 53 created by the weld arc 42 of the electric arc welder 40 that includes a portion of the component edges 63 and 65 and the consumable wire electrode 44 (if present), this molten material 53 is further energized by the defocused hybrid laser 30 thereby causing the molten material 53 to penetrate deeper to include the bridge piece 60 to form the common molten pool 52. The metal from the bridge piece 60 becomes molten and intermixed with the other molten materials 53 to form a common molten pool 52. The intermixed molten materials from the common molten pool 52 join upon cooling to form one continuous piece or a weld 54 (see FIG. 5) joining the components 62 and 64.

In one embodiment, the defocused laser 30 and the electric arc welder are automated. In one embodiment, the defocused laser 30 and electric arc welder 40 are mounted in separate places or mounted on a single mount 90, see FIG. 1. The mount 90 is moved at a suitable rate of speed for welding, such as, for example between approximately 762 millimeters per minute (30 inches per minute) to approximately 3048 millimeters per minute (120 inches per minute), or alternatively between approximately 1016 millimeters per minute (40 inches per minute) to approximately 2286 millimeters (90 inches per minute), or alternatively between approximately 1270 millimeters per minute (50 inches per minute) to approximately 2032 millimeters (80 inches per minute) to achieve a full penetration weld 54 between the components 62 and 64.

In one embodiment, the defocused laser 30 leads the electric arc welder 40 in the weld direction 66. As shown in FIGS. 1 and 3, the distance 38 between the defocused laser beam 32 and consumable wire electrode 44 of electric arc welder 40 is between approximately 2.5 millimeters to approximately 12 millimeters, or alternatively between approximately 3.0 millimeters to approximately 8.0 millimeters, or alternatively between approximately 3.5 millimeters to approximately 6.0 millimeters to obtain adequate interaction of the two heat sources to create a stable common molten pool 52. Distances 38 under 2.5 millimeters cause the defocused laser beam 32 to contact the electrode 44 of the electric arc welder 40 which results in molten material splattering and an unstable weld arc 42. Distances 38 greater than 12 millimeters do not allow for adequate interaction of the defocused laser beam 32 and weld arc 44 to create the desired common molten pool 52.

In one embodiment, the defocused laser 30 is behind the electric arc welder 40 in the weld direction 66. The distance 38 between the defocused laser beam 32 and consumable wire electrode 44 of electric arc welder 40 is between approximately 2.5 millimeters to approximately 12 millimeters, to obtain adequate interaction of the two heat sources to create a stable common molten pool 52.

In one embodiment, the electric arc welder 40 is selected from welders including consumable electrodes, such as, but not limited to, a gas metal arc welder (GMAW), a flux cored arc welder (FCAW) and welders having non-consumable electrodes with wire feeding, such as, but not limited to, a gas tungsten arc welder (GTAW) with wire feeding and a plasma arc welder (PAW) with wire feeding. In general operation, with or without the defocused laser 30, weld arc 42 of the electric arc welder 40 and the consumable wire electrode 44 melts a portion of the edges 63 and 65 of the components 62 and 64 to form molten material 53. The addition of the defocused laser 30 provides additional energy to the molten material 53 to allow for further penetration and to melt the bridge piece 60 to form the common molten pool 52. In one embodiment, the electric arc welder 40 may also emit shielding gas for protecting the weld during welding.

Figure 2:
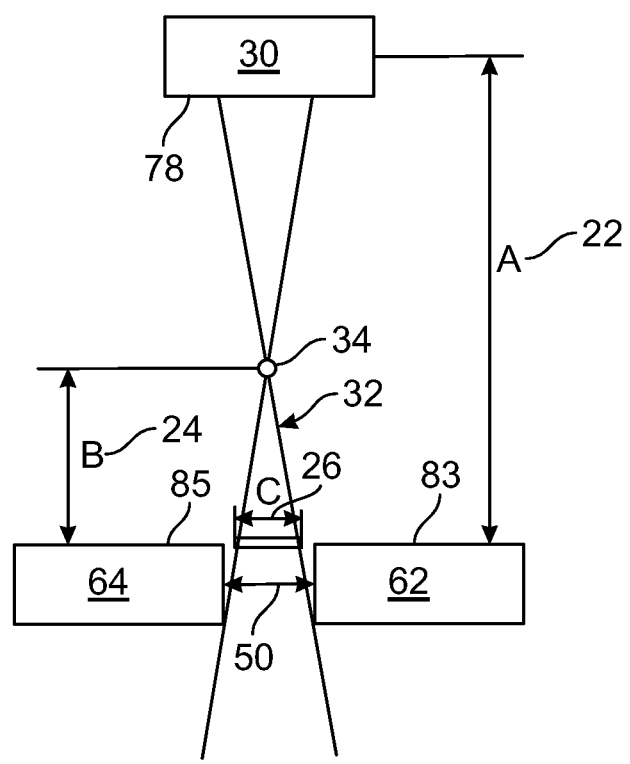
FIG. 2 is a schematic view of the defocused laser of the hybrid welding system of the present disclosure.

In one embodiment, the defocused laser 30 is selected from a Nd:YAG laser, a $CO_2$ laser, a fiber laser, and a disk laser. In one embodiment, the defocused laser 30 is a high-density powered laser. The defocused laser 30 has a defocused laser beam 32. As shown in FIG. 2, the defocused high-density laser 30 has a positively defocused laser beam 32. By a "positively defocused" beam it is meant that the focus point 34 of the laser 30 is above the surface 83 and 85 of the components 62 and 64 to be joined, such that the remaining energy or defocused beam 32 from the defocused laser 30 is directed outward towards the surface 83 and 85 of components 62 and 64 or the common molten pool 52 in a wider manner. The positively defocused beam 32, unlike a focused laser beam, provides energy that is more evenly dispersed over a distance "C" 26, instead of at a single point on the surface of one or more of the components 62 and 64. Focused lasers, because of the energy density directed to one point, result in keyholes in the material, thereby causing the molten material to blow through the bottom of the weld. In the present embodiment, the defocused laser beam 32 effectively increases the area heated or energized and allows for a deeper penetration weld in the material. The defocused laser beam 32 adds energy and/or heat to the molten material 53 created by the electric arc welder 40 to allow for further penetration of the weld and melting of the bridge piece 60 to create the common molten pool 52. The common molten pool 52 provides a full penetration weld 54 (see FIG. 5) between the components 62 and 64.

As shown in FIG. 2, the distance "A" 22 is the distance from the laser head 78 to the top surface 83 and 85 of the components 62 and 64. Distance "A" 22 is typically defined by the manufacture of the laser head. In one embodiment, distance "A" 22 between the laser head 78 and the top surface 83 and 85 of the components 62 and 64 remains fixed. In an alternative embodiment, distance "A" 22 between the laser head 78 and top surface 83 and 85 of the components 62 and 64 is varied. The defocus distance "B" 24 is the distance from the laser focus point 34 to the top surface 83 and 85 of the components 62 and 64. The defocus distance "B" 24 is varied depending on the size of the gap 50 to be welded. For larger gaps, a larger defocus distance "B" 24 is used and for smaller gaps, a smaller defocus distance "B" 24 is used. In one embodiment, the defocus distance "B" 24 is approximately 5 millimeters to approximately 15 millimeters, or alternatively approximately 8 millimeters to approximately 13 millimeters, or alternatively approximately 10 millimeters to approximately 12 millimeters.

Figure 5:
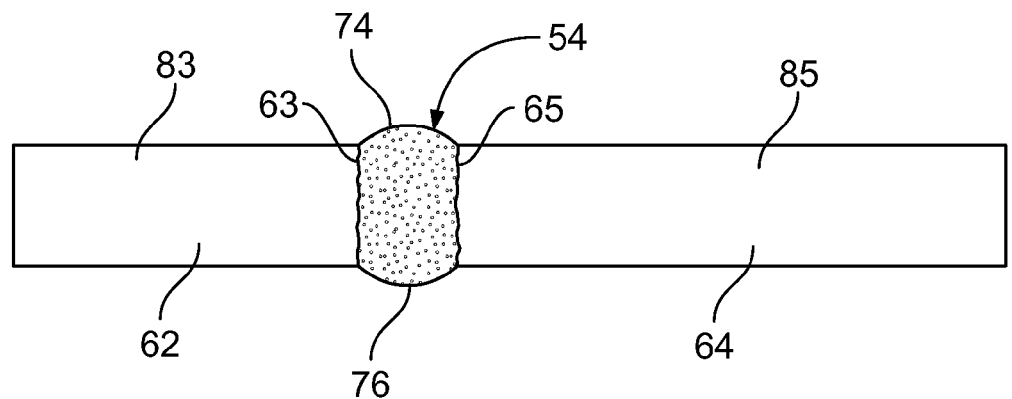
FIG. 5 is a cross-sectional view along line 5-5 of FIG. 1 of a full penetration weld created by the hybrid welding system of the present disclosure.

As shown in FIG. 4, the common molten pool 52 created by hybrid welder 20 (not fully shown) includes molten material 53 and the melted bridge piece 60. The molten material 53 is generally a deposit from a consumable electrode or wire 44 melted by the arc 42 of the electric welder 40 and a portion of the melted surface 63 and 65 of the components 62 and 64. The additional energy provided from the defocused laser 30 by way of the defocused laser beam 32 allows for a deeper and wider penetration weld by effectively bringing down the molten material 53, such that molten material 53 contacts and melts the bridge piece 60 to form the common molten pool 52. The defocused laser beam 32 provides the additional energy to allow the molten material 53 to melt the bridge piece 60 and form the common molten pool 52 but prevents blowouts or dropping of the weld through the bridge piece 60 to provide a full penetration weld 74 as shown in FIG. 5.

In an alternative embodiment, the hybrid welding system 10 welds joints 80 using a bridge piece 60 having gaps 50 between components 62 and 64. Joints that can be welded using the hybrid welding system 10 include, but are not limited to, butt weld joints, edge weld joints, tee weld joints, and corner weld joints.

The components 62 and 64 to be welded are selected from materials such as ferrous and non-ferrous materials. Examples of ferrous and non-ferrous materials are, but not limited to, superalloys, mild steel, high-strength steel, stainless steel, titanium, aluminum, and combinations thereof. The bridge piece 60 is selected from a shim, stacked shims, wire, stacked wires, or a combination thereof. In one embodiment, the bridge piece 60 is selected from materials that are similar to the component 62 and 64 materials. In another embodiment, the bridge piece is selected from a material that is different from the components 62 and 64. Examples of ferrous and non-ferrous materials used for the bridge piece 60, are, but not limited to, superalloys, mild steel, high-strength steel, stainless steel, titanium, aluminum, and combinations thereof. In one embodiment the bridge piece 60 is sized to fill the gap 50 completely. In another embodiment, the bridge piece 60 is sized to fill the gap 50 starting from the bottom of the components 62 and 64 (see FIG. 4), and a complete fill is not required (see FIG. 4). In one embodiment, a gap of approximately 3.0 millimeters can be bridged using the hybrid welding system 10 of the present disclosure without using a backing plate.

A method of welding at least two adjacent components 62 and 64 having a gap 50 of up to approximately 3.0 millimeters using the hybrid welding system 10 is provided. The hybrid welder 20, having a defocused laser 30 and an electric arc welder 40, is positioned above at least two components 62 and 64 to be welded or at least two components to be welded 62 and 64 are positioned below the hybrid welder 20. The at least two components 62 and 64 are aligned such that a gap 50 of up to approximately 3.0 millimeters is present between the at least two components 62 and 64. Next, a bridge piece 60 is placed adjacent to one or both of the aligned components 62 and 64. The width of the bridge piece 60 is selected such that the bridge piece 60 generally has the same width as the gap 50. The bridge piece 60 is selected from a wire, stacked wires, a shim, or stacked shim that has the desired properties to create a full penetration weld between the at least two components 62 and 64. The hybrid welder 20 directs energy toward one or both of the aligned components 62 and 64, with the defocused laser 30. In one embodiment, the defocused laser 30 is in the leading position with the electric arc welder 40 trailing. In another embodiment, the electric arc welder 40 is leading with the defocused laser 30 trailing. The defocused laser 30 and the electric arc welder 40 create a common molten pool 52 operable to provide a full penetration weld 54 that bridges the gap 50 at a high constant weld speed using a single pass.

In an alternative embodiment, more than one pass with the hybrid welder 20 can be used to provide a full penetration weld 54. In another alternative embodiment, the method of welding is performed with a backing plate at a high constant weld speed to obtain a full penetration weld 54 with desired quality.

The disclosed hybrid welding system 10, hybrid welder 20, and method of welding may be used in any process where welding is required. The disclosed hybrid welding system 10, hybrid welder 20, and method of welding may be used in all industries using welding, including manufacturing, remanufacturing, and repair applications.

One advantage of an embodiment of the present disclosure includes a method and apparatus that permits high constant welding speeds.

Another advantage of an embodiment of the present disclosure is faster welding speeds for thinner materials.

Another advantage of an embodiment of the present disclosure is automated welding without adaptive control.

Yet another advantage of an embodiment of the present disclosure is high constant weld speeds for uneven gaps and mismatches in the components to be welded.

Another advantage of an embodiment of the present disclosure is that a full penetration weld is achieved for gaps of up to approximately 3 millimeters in size.

Another advantage of an embodiment of the present disclosure is that a full penetration weld is achieved for uneven gaps of up to approximately 3 millimeters in size.

Example

Figure 6:
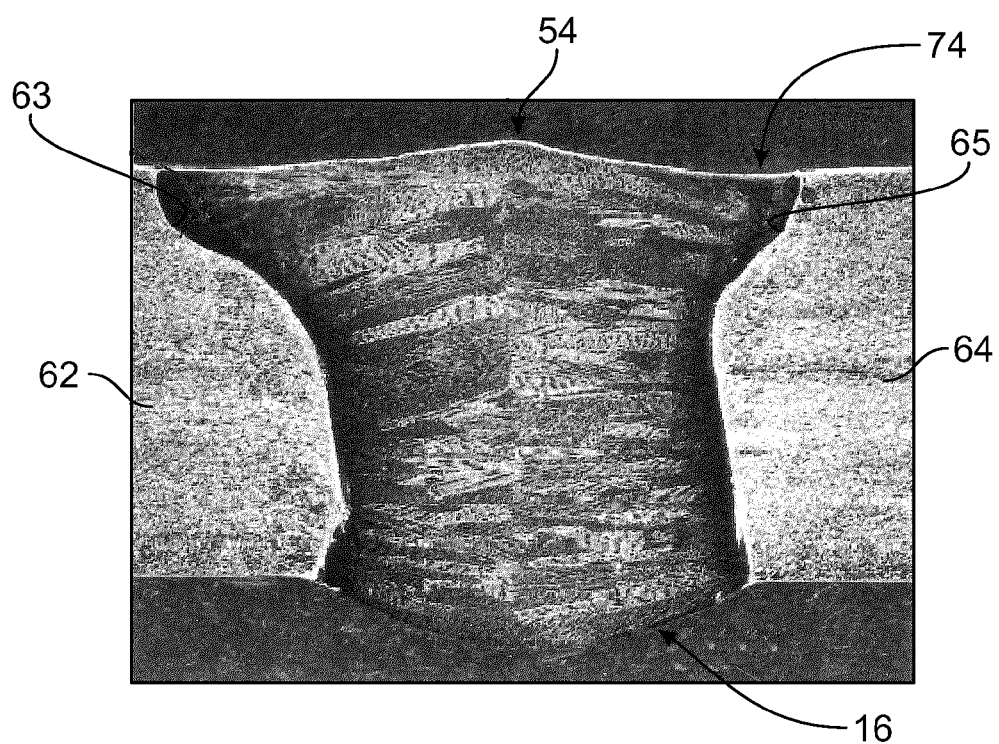
FIG. 6 is a cross-section of the full penetration weld created by the hybrid welding system of the present disclosure.

Two 3 millimeter thick stainless steel plates were welded using a hybrid welding system 10 including a defocused high-density laser 30 and an electric arc welder 40. The gap 50 that was bridged between the 3 millimeter thick stainless steel plates was measured and was approximately 2.34 millimeters. The defocused high-density laser 30 led the electric arc welder 40 to create a common molten pool 52, which resulted in a full penetration weld 52 between the two stainless steel plates. The laser used was a lamp-pumped ND:YAG laser having a laser power of 3 kW. The electric arc welder 40 was a GMAW set at 26 Volts and a wire feeding speed of 450 inches per minute. The spacing between the center of the defocused high-density laser 30 and electric arc welder 40 was approximately 2.5 millimeters. The hybrid welding system 20 was operated at a high constant weld speed of approximately 1.524 meters per minute (60 inches per minute). After the weld was allowed to cool a visual inspection confirmed uniform weld beads on both the front and back sides of the welded plates or components. FIG. 6 is a cross-section of the full penetration weld 54 obtained using hybrid welding system 10 of the present disclosure. The weld 54 includes a top bead 74 and under bead 76.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A hybrid welding system comprising:
   a hybrid welder, the hybrid welder having a defocused laser and an electric arc welder;
   at least two adjacent components to be welded, the at least two adjacent components having a gap therebetween, the gap being up to approximately 3.0 millimeters;
   at least one bridge piece, wherein the at least one bridge piece is adjacent to one or more of the at least two adjacent components;
   wherein the defocused laser and the electric arc welder are arranged and disposed to direct energy toward the at least two adjacent components to create a common molten pool, and wherein the defocused laser provides additional energy allowing the common molten pool to melt the at least one bridge piece without dropping a weld through the bridge piece to provide a full penetration weld to bridge the gap at a high constant weld speed.

2. The hybrid welding system of claim 1, wherein the defocused laser beam is selected from a Nd:YAG laser, a $CO_2$ laser, a fiber laser, and a disk laser.

3. The hybrid welding system of claim 1, wherein the electric arc welder is selected from a gas tungsten arc welder with wire feeding, a gas metal arc welder, a flux cored arc welder, and a plasma arc welder with wire feeding.

4. The hybrid welding system of claim 1, wherein a plurality of defocused laser beams and a plurality of electric arc welders are used to bridge the gap.

5. The hybrid welding system of claim 1, wherein the at least one bridge piece is a shim, stacked shims, wire, stacked wire, and combinations thereof.

6. The hybrid welding system of claim 1, wherein the bridge piece is sized to fill the gap.

7. The hybrid welding system of claim 1, wherein the at least two adjacent components to be welded comprise ferrous and non-ferrous materials, the ferrous and non-ferrous materials comprising: superalloys, mild steel, high-strength steel, stainless steel, titanium, aluminum, and combinations thereof.

8. A method of welding at least two adjacent components comprising:
   providing a hybrid welder having a defocused laser and an electric arc welder;
   providing the two adjacent components having a gap therebetween, the gap being up to approximately 3.0 millimeters;
   placing a bridge piece adjacent to one or both of the adjacent components; and
   directing energy toward one or both of the adjacent components with the hybrid welder, wherein the defocused laser and the electric arc welder create a common molten pool, and wherein the defocused laser provides additional energy allowing the common molten pool to melt the at least one bridge piece without dropping a weld through the bridge piece to provide a full penetration weld that bridges the gap at a high constant weld speed.

9. The method of claim 8, wherein the defocused laser is a high-power density laser beam selected from a Nd:YAG laser, a $CO_2$ laser, a fiber laser, and a disk laser.

10. The method of claim 8, wherein the electric arc welder is selected from a gas tungsten arc welder, a gas metal arc welder, a flux cored arc welder, and a plasma arc welder.

11. The method of claim 8, wherein the method is performed in a single pass or in multiple passes.

12. The method of claim 8, wherein the method is performed without a backing plate.

13. The method of claim 8, wherein the at least one bridge piece is a shim, stacked shim, wire, stacked wire, and the bridge piece is sized to fill the gap.

14. The method of claim 8, wherein the high constant weld speed is approximately 760 millimeters per minute to approximately 3050 millimeters per minute.

15. A hybrid welding apparatus comprising:
   a defocused laser; and
   an electric arc welder, wherein the defocused laser and the electric arc welder are arranged and disposed to direct energy toward at least two adjacent components having a gap therebetween, the gap being up to approximately 3.0 millimeters and including at least one bridge piece, wherein the directed energy creates a common molten pool, and wherein the defocused laser provides additional energy allowing the common molten pool to melt the at least one bridge piece without dropping a weld through the bridge piece to provide a full penetration weld to bridge the gap at a high constant weld speed.

16. The hybrid welding apparatus of claim 15, wherein the defocused laser is selected from a Nd:YAG laser, a $CO_2$ laser, a fiber laser, and a disk laser and the electric arc welder is selected from a gas tungsten arc welder with wire feeding, a gas metal arc welder, a flux cored arc welder, and a plasma arc welder with wire feeding.

17. The hybrid welding apparatus of claim 15, wherein the high constant weld speed is approximately 760 millimeters per minute to approximately 3050 millimeters per minute.

* * * * *